J. E. MURRAY.
HORSESHOE.
APPLICATION FILED JAN. 23, 1917.
1,236,203.
Patented Aug. 7, 1917.
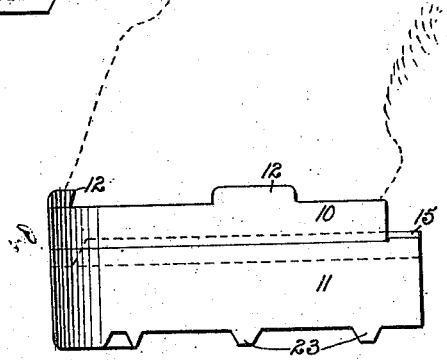
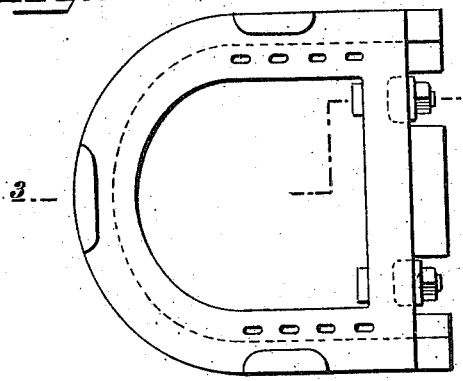
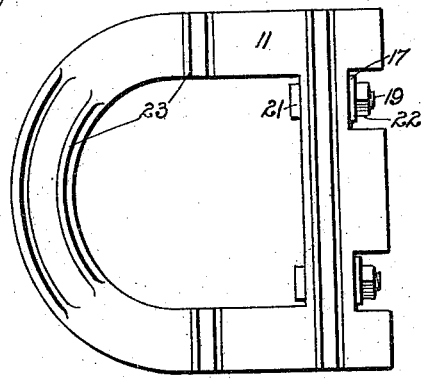
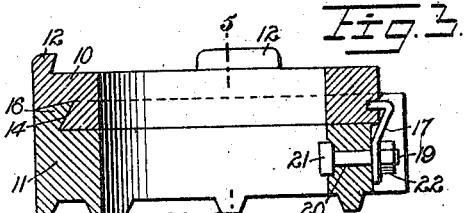
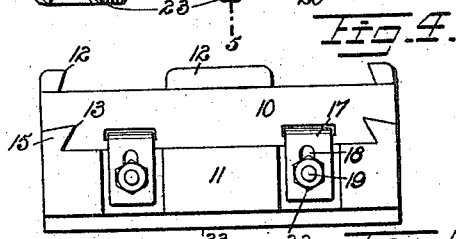
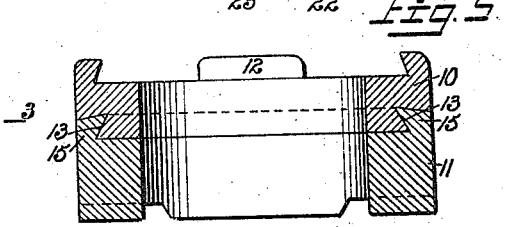
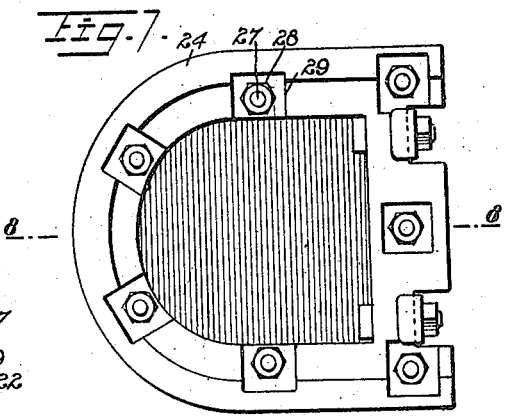
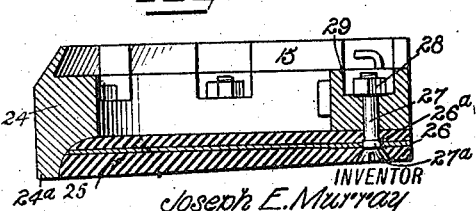
WITNESSES
H. J. Walker
G. B. Marshall
INVENTOR
Joseph E. Murray
BY
ATTORNEYS

UNITED STATES PATENT OFFICE.

JOSEPH EUGENE MURRAY, OF MORRISTOWN, NEW JERSEY.

HORSESHOE.

1,236,203.  Specification of Letters Patent.  Patented Aug. 7, 1917.

Application filed January 23, 1917. Serial No. 143,896.

*To all whom it may concern:*

Be it known that I, JOSEPH E. MURRAY, a citizen of the United States, and a resident of Morristown, in the county of Morris and State of New Jersey, have invented a new and Improved Horseshoe, of which the following is a full, clear, and exact description.

My invention has for its object to provide a horseshoe having a section which is secured to the horse's hoof, and which has horizontal guideways in which guides on another section may slide, the second section being held in place by clamps, and it being possible to provide this second section with calks or with any other desired surface.

Additional objects of the invention will appear in the following specification, in which the preferred form of the invention is disclosed.

In the drawings, similar reference characters denote similar parts in all the views, in which—

Figure 1 is a side view of my improved horseshoe;

Fig. 2 is a plan view of the horseshoe;

Fig. 3 is a sectional view on the line 3—3 of Fig. 2;

Fig. 4 is a rear view of the horseshoe shown in Fig. 1;

Fig. 5 is a transverse sectional view of the horseshoe;

Fig. 6 is an inverted plan view of the horseshoe;

Fig. 7 is a view showing a modified form of the invention; and

Fig. 8 is a sectional view on the line 8—8 of Fig. 7.

By referring to the drawings, it will be seen that the horseshoe is constructed in two sections 10 and 11, the section 10 having guards 12 which normally fit around the animal's hoof. This section 10 is nailed to the animal's hoof in a manner readily understood. At its sides the section 10 has guideways 13, and these guideways are connected by a transverse guideway 14 at the front of the section 10, so that guides 15 at the sides of the section 11 may slide in the guideways 13, and a transverse guide 16 at the front of the section 11 may fit in the transverse guideway 14. When the section 11 has been slid rearwardly relatively to the section 10, and the transverse guide 16 fits in the transverse guideway 14 to prevent further rearward movement of the section 11 relatively to section 10, section 11 is held in this position by means of clamps 17, which are provided with slots 18 through which bolts 19 are disposed. These bolts 19 are also disposed through orifices 20 in the rear part of section 11, the bolt heads 21 engaging the forward edges of this rear part of section 11 to limit the rearward movement of the bolts relatively to the said section 11. It will be understood that the clamps 17 may be raised for engagement with the rear of section 10, and that by turning nuts 22 against the clamps 17, the clamps may be held in the position indicated in Fig. 3 of the drawings. These nuts 22 mesh with the thread of the bolts 19. When it is desired to remove the section 11, the nuts 22 are unscrewed, thereby permitting the rearward movement of the clamps 17 so that they may fall relatively to the bolts 19, this movement being permitted by their slots. When the clamps 17 are out of engagement with the rear of section 10, section 11 may be slid forwardly so that another section may be substituted for the one removed.

The section 11 may be provided with calks 23, or, if desired, a section 24 may be employed which is secured to the section 10 in the same manner that section 11 is secured to section 10, this section 24, however, having a rubber heel 25, as shown in Fig. 8 of the drawings. This rubber heel 25 is reinforced by a steel plate 26 which is embedded in the rubber heel, and the rubber heel, together with its steel reinforcing plate 26 is secured to the bottom of the section 24 by means of bolts 27. Nuts 28 which are provided for holding the bolts 27 in place, are disposed in openings 29, so that they will be disposed below the plane of the guards 15. The bolts 27 have shoulders 27ª which fit the openings 26ª in the plate 26 to prevent the bolts from turning. The section 24 is preferably provided with a toe calk 24ª.

Having thus described my invention, I claim as new and desire to secure by Letters Patent:

1. In a horseshoe, a section having means by which it may be secured to the hoof of an animal and having guideways extending from front to rear along the sides and a transverse guideway at the front of the section, a second section having guides at its sides and a transverse guide at its forward end, the guides at the sides of the second section being movable in the guideways at the sides of the first section, and the transverse guide being movable into the transverse guideway to limit the rearward movement of the second section relatively to the first section, bolts secured to the second section, and clamps having slots in which the bolts are disposed which may be raised for engaging the first section and may be secured in raised position by the bolts.

2. In a horseshoe, a section having means by which it may be secured to an animal's hoof and provided with guideways extending rearwardly, a second section having guides movable in the guideways, means to limit the rearward movement of the second section relatively to the first section, a bolt extending through the rear part of one of the sections, a clamp for engaging the other section and having a slot in which the bolt is disposed, and a nut on the bolt for pressing the clamp against the last mentioned section.

JOSEPH EUGENE MURRAY.